United States Patent
Gibson

(10) Patent No.: US 6,553,512 B1
(45) Date of Patent: Apr. 22, 2003

(54) METHOD AND APPARATUS FOR RESOLVING CPU DEADLOCKS

(75) Inventor: James Douglas Gibson, Loveland, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/505,978

(22) Filed: Feb. 16, 2000

(51) Int. Cl.7 .................................. G06F 11/00
(52) U.S. Cl. ..................... 714/17; 714/48; 714/10
(58) Field of Search ................. 714/17, 43, 48, 714/10

(56) References Cited

U.S. PATENT DOCUMENTS

| | | | | |
|---|---|---|---|---|
| 4,348,722 A | * | 9/1982 | Gunter et al. | 714/56 |
| 5,006,980 A | * | 4/1991 | Sanders et al. | 712/219 |
| 5,664,088 A | * | 9/1997 | Romanovsky et al. | 714/13 |
| 5,682,551 A | * | 10/1997 | Pawlowski et al. | 710/36 |
| 5,889,975 A | * | 3/1999 | Allingham | 710/311 |
| 6,247,118 B1 | * | 6/2001 | Zumkehr et al. | 712/228 |
| 6,292,910 B1 | * | 9/2001 | Cummins | 714/43 |
| 6,453,430 B1 | * | 9/2002 | Singh et al. | 714/47 |

OTHER PUBLICATIONS

Microsoft Corporation. Microsoft Knowledge Base Article—Q171773, How to Eliminate a Process That Is Not Responding Without Restarting the Computer. Jul. 23, 1997.*

* cited by examiner

Primary Examiner—Robert Beausoliel
Assistant Examiner—Yolanda L. Wilson

(57) ABSTRACT

A method and apparatus for handling errors that deadlock a CPU by first attempting to resolve the deadlock without issuing a bus error and without restarting the CPU. If the deadlock cannot be resolved without issuing a bus error, then a bus error is issued and the CPU attempts to restart. The method involves comparing the number of clock cycles taken to execute an instruction to a designated abort value. When an instruction has taken the full abort value of cycles but has not retired, a machine-check abort (MCA) is issued to attempt to resolve the deadlock. The method also involves comparing the number of clock cycles to a larger bus error value. If the MCA does not break the deadlock within a certain period—i.e., before the bus error value is reached—then a bus error is issued and the machine attempts to reset.

20 Claims, 3 Drawing Sheets

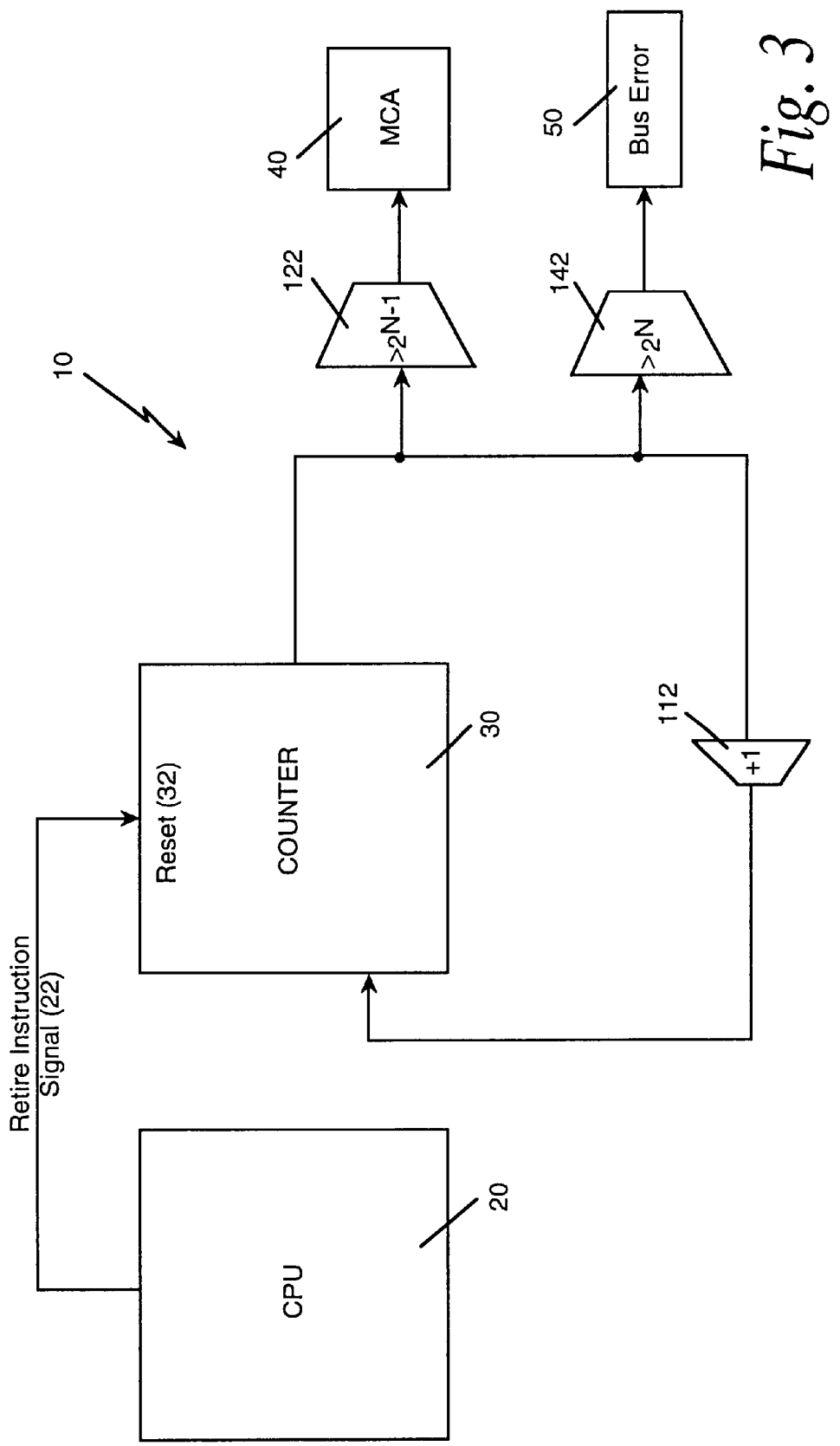

METHOD AND APPARATUS FOR RESOLVING CPU DEADLOCKS

TECHNICAL FIELD

The technical field relates generally to digital computer systems and more particularly, but not by way of limitation, to systems for detecting errors within the instructions processed in such computer systems.

BACKGROUND

A central processing unit (CPU) may stop making forward progress for various reasons. For example, a CPU deadlock may occur when the code makes a memory reference to a non-existing memory. In some systems, the memory controllers will not respond to such an erroneous memory reference, causing the system to deadlock, waiting for data to return from a memory that does not exist. When a CPU deadlock occurs, there must be some mechanism for releasing the CPU from this deadlocked state.

One such mechanism is the triggering of a bus error to clear the deadlock. However, triggering a bus error substantially impacts the system by requiring the system to be restarted. In particular, triggering a bus error requires resetting the memory controllers. Triggering a bus error is expensive in terms of time and software required to fix the problem. A bus may have multiple CPUs, in which case all of them usually must be reset upon the triggering of a bus error.

What is needed is method and an apparatus to resolve the CPU deadlock without triggering a bus error, if possible. In particular, what is needed is a method of attempting to resolve the CPU deadlock first through software, and then, if that method fails, invoking traditional methods of resolving the deadlock, such as triggering a bus error.

SUMMARY

A method is provided for handling errors that deadlock a CPU by first attempting to resolve the deadlock without issuing a bus error and without restarting the computer. If the deadlock cannot be resolved without issuing a bus error, then a bus error is issued and the computer attempts to restart itself. The method involves comparing the number of clock cycles taken to execute an instruction to a designated abort value. When the instruction has taken the full abort value of cycles but has not retired, a machine-check abort (MCA) is issued to attempt to resolve the deadlock. The method also involves comparing the number of clock cycles to a larger bus error value. If the MCA does not break the deadlock within a certain period—i.e., before the bus error value is reached—then a bus error is issued and the computer attempts to reset.

A computer system includes a CPU, a counter, and a software programmable register. The counter determines the number of clock cycles consumed during the execution of an instruction and stores that number in the register. The number of clock cycles taken is compared to execute an instruction to a designated abort value. When an instruction has taken the full abort value of cycles but has not retired, a machine-check abort (MCA) is issued to attempt to resolve the deadlock. The number of clock cycles is also compared to a larger bus error value. If the MCA does not break the deadlock within a certain period—i.e., before the bus error value is reached—then a bus error is issued and the CPU attempts to reset itself.

SUMMARY OF DRAWINGS

FIG. 3 is a block diagram of the computer system capable of resolving CPU deadlocks.

DETAILED DESCRIPTION

A means is provided for handling CPU deadlocks without causing a bus error and without resetting the computer system, when possible. Many CPU deadlocks are caused by memory bus errors and cannot be resolved without resetting the system. Some CPU deadlocks may be caused by errors other than memory bus errors. This is particularly true in mixed-architecture CPUs (i.e. those architectures capable of processing more than one type of instruction set) such as the IA-64 architecture. For example, a deadlock may be caused during hardware emulation of the IA-32 architecture on the CPU. In these cases in which the deadlock is caused by errors other than a memory bus error, the system may be able to recover without resetting the system. Existing methods of handling CPU deadlocks simply cause the bus error every time and reset the system. An apparatus and a method attempt to resolve CPU deadlocks without resetting the system by invoking a abort (MCA) before triggering a memory bus error. This gives the system the opportunity to resolve the error without resetting if that is possible.

Figure 1:
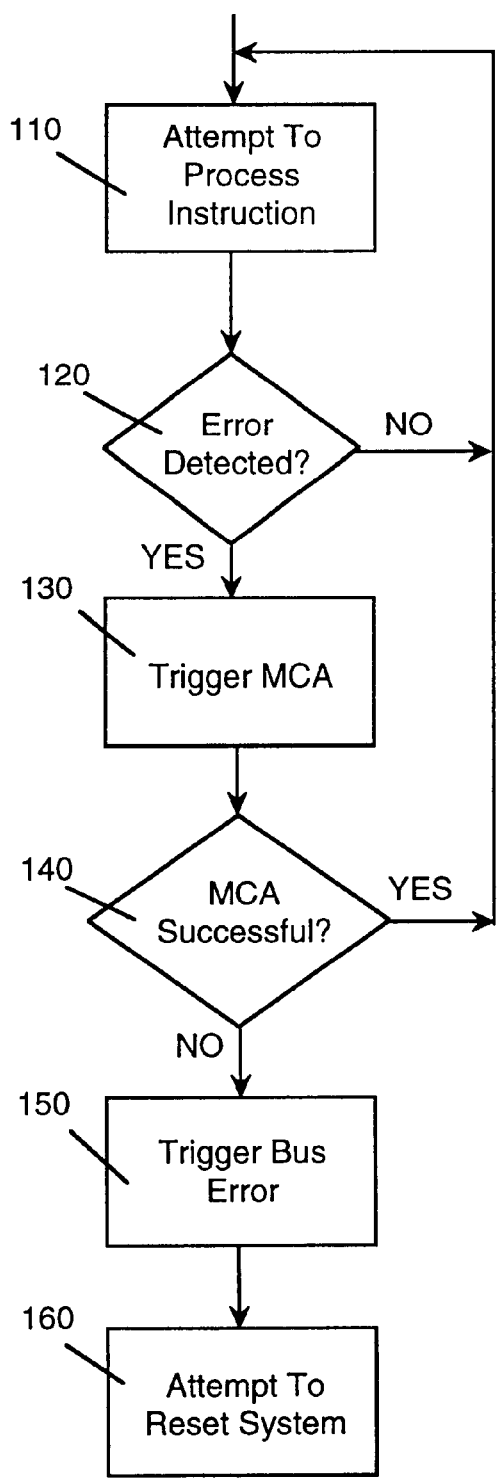
FIG. 1 is a flow chart showing a method for resolving CPU deadlocks.

FIG. 1 shows a flow chart of the method of operation for resolving CPU deadlocks. The CPU processes instructions 110. This processing continues until a CPU error occurs, which deadlocks the CPU. If an error occurs 120, then the system triggers 130 an MCA. The MCA invokes a software mechanism that attempts to resolve the CPU error without resetting the CPU. If the MCA is successful 140, then the CPU continues processing instructions 110. If the machine-check abort fails to resolve the CPU problem, then a bus error is triggered 150 and the CPU attempts to reset itself in the traditional fashion.

Figure 2:
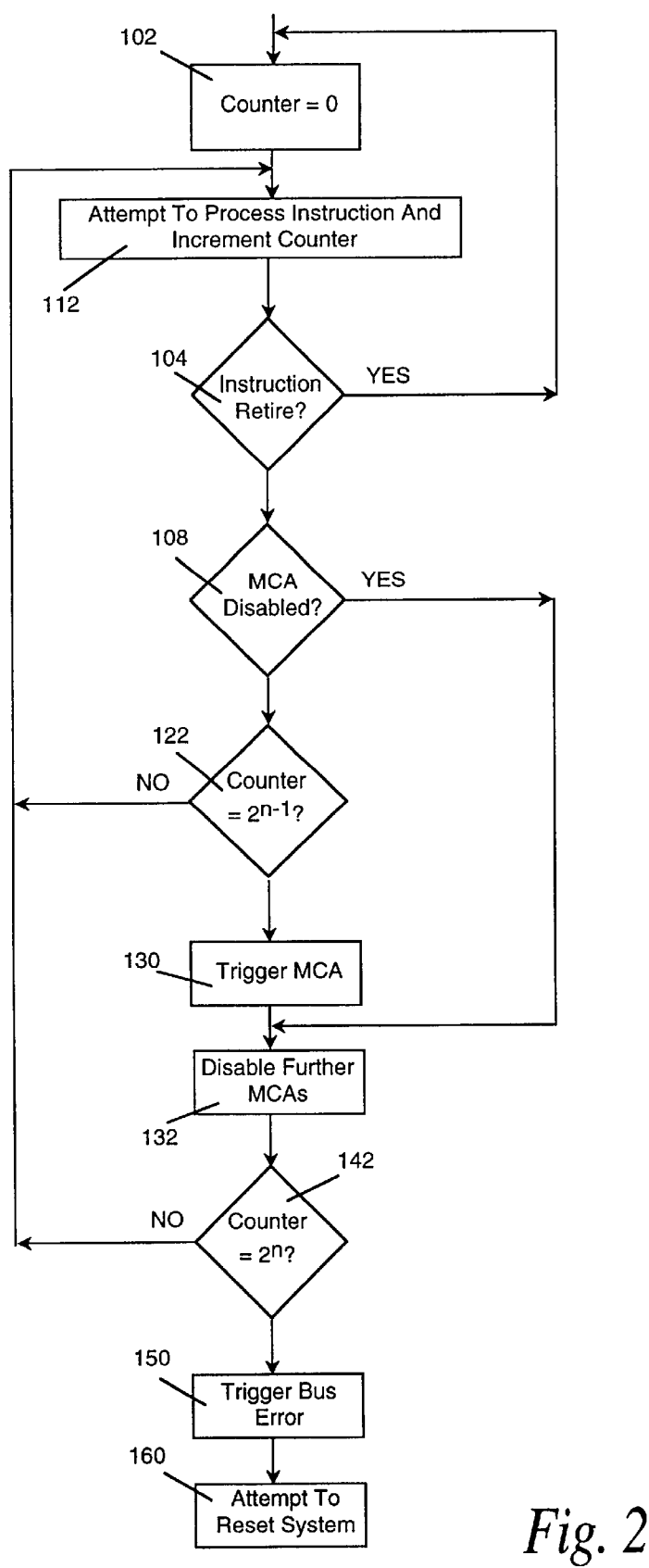
FIG. 2 is a more detailed flow chart of FIG. 1.

FIG. 2 is a more detailed flow chart of one embodiment of the operation for resolving CPU deadlocks. Initially, a counter is set 102 to zero. The CPU then attempts to process 112 an instruction. As soon as the instruction is retired 104, the counter is reset 102 to zero and the process begins anew. If the instruction is not retired 104, then the counter is incremented 106. A test function 108 determines whether the MCA has been disabled. As explained below, when an MCA issues, future MCAs are disabled 132. If the MCA is disabled, then the test function 108 skips the MCA-related functions 122, 130, 132. If the MCA is not disabled, then the CPU continues to process the instruction as usual 112, for so long as the counter does not reach a predefined abort value 120 ($2^{n-1}$ in the embodiment shown). If the counter does reach the abort value, then the MCA is triggered 130, with the hope that the MCA will resolve the CPU problem. At the same time, a software programmable bit is also set 132 to prevent any further MCAs from issuing. The counter is then compared 142 to a predefined bus error value ($2^n$ in the embodiment shown). If the counter has not reached the bus error value, then the CPU continues processing 112. If the counter reaches or exceeds the bus error value, then a bus error is triggered 150, and the CPU tries to reset 160. The CPU then clears the counter 102 and continues processing 112.

FIG. 3 shows a block diagram of the hardware for resolving CPU deadlocks. A computer system 10 has a CPU 20 electrically connected to a counter 30. The counter 30 increments 112 every clock cycle while the CPU 20 attempts to execute an instruction. When the counter 30 reaches 122 a predetermined abort value (represented as $2^{n-1}$ in the embodiment of FIG. 3), then the system invokes an MCA 40 to attempt to resolve the problem. Meanwhile, the counter 30 continues to increment 112. If the deadlock is not resolved by the MCA 40 before the counter 30 reaches 142 a predetermined bus error value (represented as $2^n$ in the embodiment of FIG. 3), then traditional methods of handling the deadlock are used, such as invoking a bus error 50 and restarting the system. The counter 30 receives a retire instruction signal 22 from the CPU 20 whenever an instruction retires. That retire instruction signal 22 resets the counter 30 as illustrated by the reset port 32 shown.

In use, the MCA causes the current CPU state to be destroyed and uses a special software handler that tries to repair the CPU. The MCA is an event that causes the system to restart at a particular memory address so that it can attempt to repair the CPU. The MCA may run on all of the CPUs or just some, for instance if only some CPUs take the MCA. The CPU quits the execution of its current code and the CPU is restarted at a particular memory address, from which code is executed. By triggering the MCA, only the current CPU is reset, and the machine tries to resolve the deadlock without resetting any other CPUs on the bus.

The MCA checks the status registers. In the event that the MCA determines that the deadlock cannot be resolved without resetting the entire system, then it triggers a bus error.

Although the method and apparatus for resolving CPU deadlocks have been described in detail with reference to certain embodiments thereof, variations are possible. For example, although the relative values the abort value and the bus error value and other certain specific information were given as examples, these examples were by way of illustration only, and not by way of limitation. The apparatus may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A method for handling CPU deadlock comprising:
   detecting a CPU deadlock;
   initiating a machine-check abort (MCA);
   determining whether the MCA cleared the CPU deadlock;
   if the MCA did clear the CPU error, continuing processing; and
   if the MCA did not clear the CPU error, triggering a bus error.

2. The method of claim 1, further comprising:
   counting a number of clock cycles while an instruction is being processed;
   comparing the number of clock cycles to an abort value; and
   if the number of clock cycles equals or exceeds the abort value, initiating the MCA.

3. The method of claim 2, further comprising:
   comparing the number of clock cycles to a bus error value; and
   if the number of clock cycles issued equals or exceeds the bus error value, triggering the bus error and attempting to reset the CPU.

4. The method of claim 3, wherein the bus error value exceeds the abort value.

5. The method of claim 4, wherein the CPU deadlock occurs in a CPU that is capable implementing a plurality of instruction sets, and wherein the MCA attempts to clear an error that is not a memory bus error.

6. The method of claim 1, wherein the MCA attempts to clear an error that is not a memory bus error.

7. The method of claim 6, wherein the CPU deadlock occurs in a CPU that is capable implementing a plurality of instruction sets.

8. A method for resolving a deadlock in a mixed-architecture CPU, comprising:
   detecting a deadlock;
   attempting to resolve the deadlock without resetting the CPU; and
   if the deadlock cannot be resolved without resetting the CPU, issuing a memory bus error to reset the CPU.

9. The method of claim 8, further comprising:
   counting the number of cycles that an instruction has been pending; and
   issuing the memory bus error when the number of cycles reaches a bus error value.

10. The method of claim 8, further comprising counting the number of clock cycles that an instruction has been pending, and wherein the step of attempting comprises using a machine-check abort (MCA) to attempt to resolve the deadlock without resetting the CPU by invoking the MCA when the number of cycles reaches an abort value.

11. A method for resolving a deadlock in a mixed-architecture CPU, comprising:
   detecting a deadlock;
   using a machine-check abort (MCA) to attempt to resolve the deadlock without resetting the CPU; and
   if the deadlock cannot be resolved without resetting the CPU, resetting the CPU.

12. The method of claim 11, further comprising:
   counting the number of clock cycles that an instruction has been pending; and
   invoking the MCA when the number of cycles reaches an abort value.

13. The method of claim 12, wherein the abort value is less than a memory bus error value at which a memory bus error is caused.

14. A computer system comprising:
- a CPU;
- a counter electrically connected to the CPU that increments every CPU cycle and resets on each instruction retirement; and
- a software programmable register electrically connected to the counter, which register
  - detects when the counter reaches or exceeds an abort count; and
  - issues a machine-check abort (MCA) when the counter equals or exceeds the abort count.

15. The computer system of claim 14, wherein the MCA attempts to resolve a CPU deadlock without resetting the system.

16. The computer system of claim 15, wherein the MCA is capable of resolving CPU deadlocks that are not caused by memory bus errors.

17. The computer system of claim 15, wherein the software programmable register sets a software programmable bit, which bit disables further machine-check aborts from the computer.

18. The computer system of claim 14, wherein the software programmable register detects whether the counter reaches or exceeds a bus error value, and if the counter reaches or exceeds a bus error value, triggers a bus error.

19. The computer system of claim 18, wherein the bus error value is greater than the abort value.

20. The computer system of 14, wherein the CPU supports a plurality of instruction sets.

\* \* \* \* \*